Feb. 26, 1929.　　　　J. M. B. LEWIS　　　　1,703,494
HEADLIGHT
Filed Oct. 21, 1924　　　2 Sheets-Sheet 1
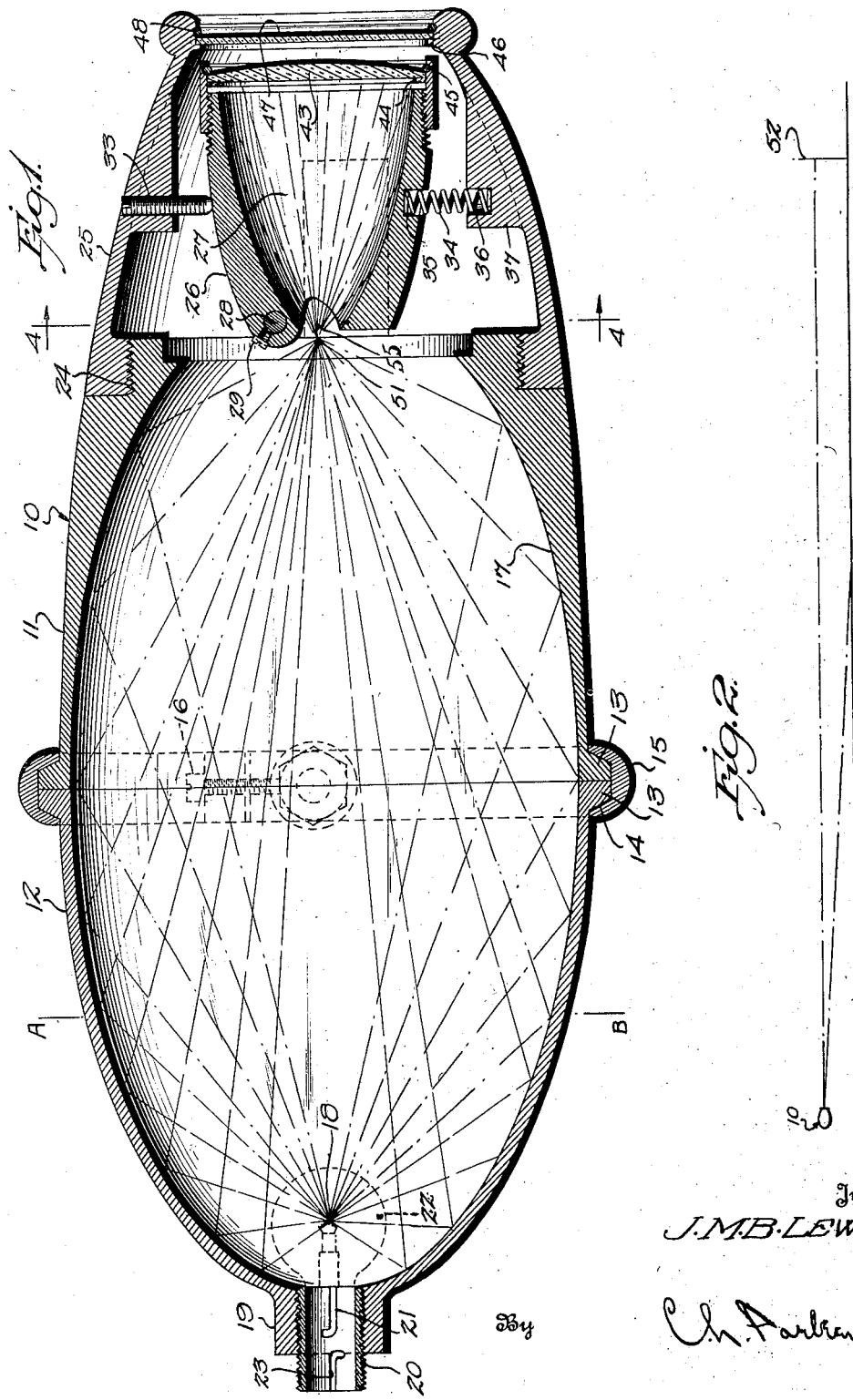
Inventor
J.M.B.LEWIS Feb. 26, 1929.　　　　　　　　　　　1,703,494
J. M. B. LEWIS
HEADLIGHT
Filed Oct. 21, 1924　　　2 Sheets-Sheet 2
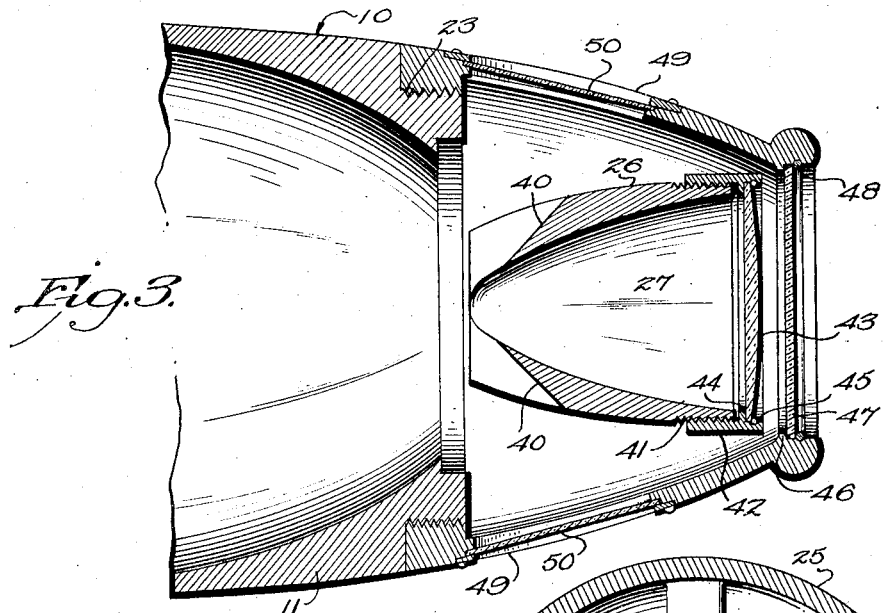
Fig. 3.
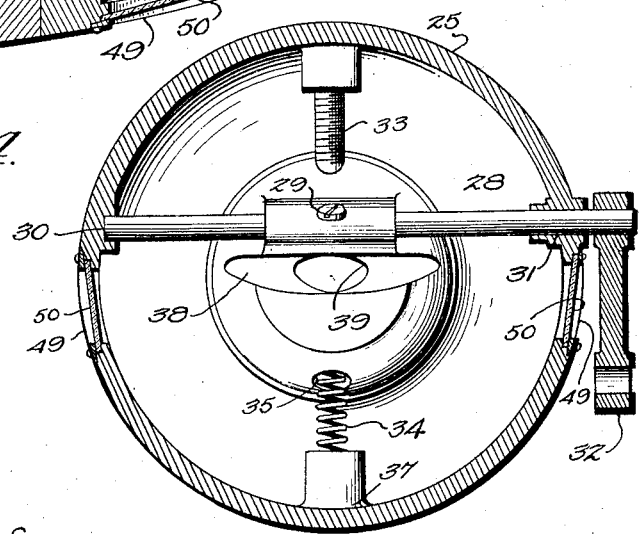
Fig. 4.
Fig. 5.
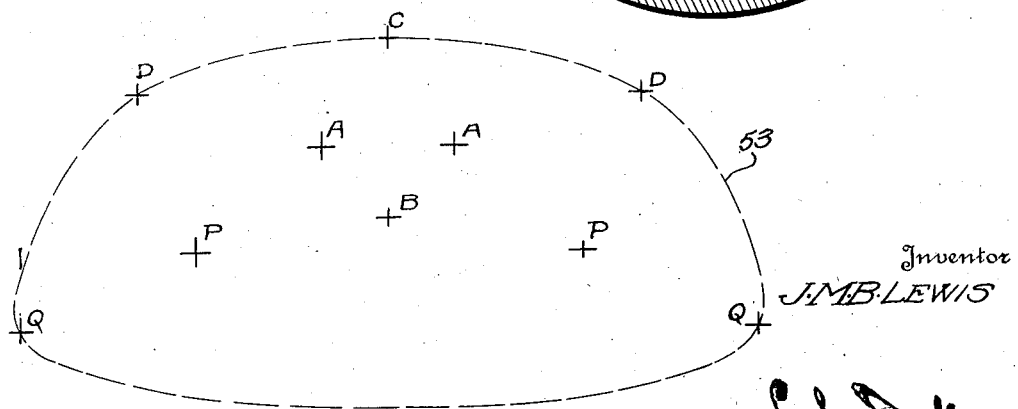
Inventor
J. M. B. LEWIS
Attorney Patented Feb. 26, 1929.

1,703,494

UNITED STATES PATENT OFFICE.

JOHN MINOR BOTTS LEWIS, OF LYNCHBURG, VIRGINIA.

HEADLIGHT.

Application filed October 21, 1924. Serial No. 744,969.

This invention relates to headlights and more particularly to automobile headlights employing novel means for utilizing a great proportion of the spherical rays from the lighting source and so controlling the distribution of the light rays as to provide effective road illumination and the elimination of glare in the eyes of approaching drivers.

An important object of the present invention is to provide a headlight adapted to project an intense beam of light, the upper limit of which may be as sharply defined as desired at the legal distance above the road.

A further object of the invention is to provide a headlight adapted to project an intense beam of light which will come well within the standards now generally accepted and still provide a considerable illumination substantially close to the vehicle.

A further object of the invention is to provide means for dipping the beam of light to lower the upper limit thereof when approaching the brow of a hill to prevent glare in the eyes of approaching drivers without diminishing the intensity of the light beam.

Other objects and advantages of the invention will be apparent during the course of the following description.

In the drawings I have shown one embodiment of the invention. In this showing,

Figure 1 is a central vertical longitudinal sectional view through the headlight, Figure 2 is a diagrammatic view, Figure 3 is a horizontal central longitudinal sectional view through the forward end of the headlight, Figure 4 is a section taken substantially on line 4—4 of Figure 1, and, Figure 5 is a diagrammatic view showing the shape of the light beam projected from the headlight.

Referring to the drawings the numeral 10 designates as a whole a headlight casing formed of forward and rear sections 11 and 12 respectively. The abutting ends of the sections 11 and 12 are provided with annular flanges 13 having beveled outer faces 14. A split band 15 surrounds the flanges 13 and is provided with an internal groove corresponding in shape to the shape of the flanges 13. The sections of the band 15 may be secured together by suitable screws 16. It will be apparent that the band is adapted to be clamped about the flanges 13 to unite the casing sections 11 and 12 into a unit.

The inner surface of the casing 10 is polished to provide a reflecting surface 17 formed substantially in the shape of a prolate spheroid having its focus substantially at the point 18. The rear end of the casing 60 is provided with an internally threaded tubular portion 19 adapted to receive a threaded sleeve 20 having a bayonet slot 21 adapted to secure within the sleeve 20 the base of a suitable lighting source 22. The rear end 65 of the sleeve 20 is provided with a similar bayonet slot 23 adapted to receive lugs of a connecting plug (not shown).

The forward end of the casing 10 is provided with a reduced screw-threaded portion 70 24 adapted to be received in the internally threaded rear end of a housing 25 as clearly shown in Figures 1 and 3.

A supplementary reflector 26 is arranged within the housing 25 and is provided in its 75 interior with a reflecting surface 27 which in shape approximates a conic section. In actual practice the shape of the reflecting surface 27 approximates that of a hyperbola, for a purpose to be described. The reflector 80 26 is secured to a transverse shaft 28 by means of a set screw 29 as shown in Figures 1 and 4. The shaft 28 is journaled at one end in a suitable bearing 30 formed in the housing 25 while the opposite end of the 85 shaft projects through a bearing 31 formed in the housing 25, and is provided externally of the housing with an operating arm 32 adapted to be controlled in any suitable manner from the driver's seat of the vehicle. It 90 will be apparent that the reflector 26 is adapted to swing in a vertical plane about the axis of the shaft 28 and upward movement of the forward end of the reflector 26 is limited by an adjusting screw 33 as clearly 95 shown in Figure 1. A compression spring 34 is arranged between the reflector 26 and the housing 25 forwardly of the shaft 28 as shown in Fig. 1. The upper end of the spring 34 is adapted to be arranged in a 100 socket 35 formed in the reflector 26 while the lower end of the spring is received in a socket 36 formed in a boss 37 preferably cast integral with the housing 25. The reflector 26 is preferably cast of relatively light metal 105 and increases in thickness toward its rear end as shown in Figures 1 and 3. The rear end of the reflector 26 is provided with a transverse groove 38 which intersects the reflecting surface 27 to provide an opening 39 110 in the rear end of the reflector 26, the shape of the opening 39 being substantially as shown in Figure 4. The groove 38 is cut from opposite sides of the reflector 26 to provide each side of the groove with forward inclined walls 40 as shown in Figure 3.

The forward end of the reflector 26 is screw-threaded as at 41 for reception within an internally screw-threaded lens holder 42. A lens 43 is arranged against a shoulder 44 formed within the lens holder and is adapted to be maintained in position by a resilient ring 45 as shown.

The forward end of the housing 25 is provided with a shoulder 46 against which is mounted a plain glass 47 adapted to be maintained in position by a ring 48. The opposite sides of the housing 25 are provided with windows 49 closed by glass plates 50 as clearly shown. The windows 49 are preferably arranged below the horizontal center of the headlight as clearly shown in Figure 4, for a purpose to be described.

In Figures 2 and 5 of the drawings I have shown diagrammatically the manner in which the light is distributed after leaving the headlight. In Figure 1 of the drawings I have illustrated the paths taken by the rays of light emanating from the light source. Referring to Figure 1 it will be seen that the rays indicated by the broken lines are intercepted and reflected forwardly to a focal point 51. Similarly the rays of light indicated by the dot and dash lines are brought to a focus at the point 51. Following the paths of rays indicated by the broken lines it will be seen that they pass through the opening 39 in the rear end of the reflector 26 from whence they pass through the lens 43 to be refracted thereby. All of the rays which are intercepted by the reflector rearwardly of the plane indicated by the line A—B will pass directly from the reflector 17 to the lens 43 without being intercepted by the reflecting surface 27. All of the rays intercepted by the reflector 17 forwardly of the plane A—B, and indicated by the dot and dash lines, will pass through the focal point 51 and on to the reflecting surface 27. It will be obvious that the entire surface of the reflector 27 will intercept rays of light from the reflector 17 back to the edges of the opening 39. The lens 43 is preferably arranged with its principal rearward focus at some point intermediate the forward and rear limits of the opening 39 and slightly forwardly of the focal point 51. The lens employed is preferably designed to cast an image of the opening 39 at a point substantially seventy feet ahead of the vehicle as indicated diagrammatically by the screen 52. Since the front and rear extremities of the opening 39 will be slightly out of the rearward focal plane of the lens 43 it will be obvious that they will not be sharply defined at the screen point 52 and hence the extreme upper limit of the beam and the extreme side limits of the beam will not be sharply defined. By adjusting the lens holder 42 through its threaded connection with the housing 26 however the upper limit of the beam may be as sharply defined as desired. The beam formed by rays of light reflected from the surface 17 rearwardly of the plane A—B will approximate the beam cast by the usual parabolic reflector now employed with its light source properly adjusted and employing a properly designed light distributing lens. I purpose, however, to utilize the rays reflected from the surface 17 forwardly of the plane A—B to greatly intensify the light beam without casting a glare in the eyes of approaching drivers thus providing a greater driving light and permitting adjustment of the reflector 26 to illuminate the road closer to the vehicle than is now the common practice, to as closely approximate daylight driving as possible. I have found that if a parabolic reflector is employed in place of the reflector 27, the rays from the portion of the reflector forwardly of the plane A—B will be reflected substantially parallel to the axis of the headlight and in passing through the lens 43 will be refracted inwardly at such an angle as to cross between the headlight and the screen point 52. While such a distribution of these light rays will provide an efficient driving light I prefer to employ a reflector 27 which will approximate a hyperbola in shape so that the rays therefrom will diverge outwardly slightly toward the lens 43. After passing through the lens 43 the rays from the reflector 27 will be refracted inwardly slightly so as to pass from the headlight substantially parallel. These rays of light greatly intensify the beam at the screen point 52. Referring to Figure 5 of the drawings it will be seen that the general shape of the more intense rays from the headlight form a resultant beam shaped substantially as shown at 53. In forming the beam 53 with the present headlight construction it has been found that the B and P points will be extraordinarily intense to provide an efficient driving light. The Q points will be materially stronger than in the present approved beam and these points will efficiently light the edges of the road. It also has been found that the A points will be of considerably greater intensity than required by most State laws and these portions of the beam will illuminate the road for a considerable distance ahead of the vehicle but being below the horizontal level of the light can cast no glare in the eyes of approaching drivers. When the various elements of the construction are properly adjusted it has been found that there will be some appreciable stray light beneath the lower limit of the intense beam shown in Figure 5. This lower portion of the beam decreases in intensity toward its lower limit, and since the lower portions of the stray light are intercepted by the road nearer the vehicle it has been found that an efficient road light is provided forwardly of the screen point 52 a considerable distance without diminishing the intensity of the beam defined by the lines 53.

The headlights may be mounted on the vehicle in any suitable manner and the light source preferably adjusted with respect to the focus 18. The headlights usually are arranged with their axes horizontal and the adjusting screw 33 is turned to the proper point to fix the upper limit of the beam 53 at the correct distance above the road at the screen point 52. When approaching the brow of the hill it will be obvious that the operating arm 32 may be moved rearwardly to tilt the reflector 26 and move the beam downwardly with respect to the vehicle, thus avoiding a glare in the eyes of approaching drivers. In connection with the tilting of the beam, attention is invited to the fact that the present structure is adapted to project forwardly of the casing a composite beam made up of what might be termed "primary" and "secondary" beams, the "primary" beam comprising the rays of light reflected directly to the lens 43 without being intercepted by the secondary reflector while the "secondary" beam is made up of rays of light which are redirected toward the lens by the secondary reflector. When the forward end of the secondary reflector is tilted downwardly at a relatively slight angle, it will be apparent that the tilting of the lens at such angle results in the slight downward tilting of that portion of the composite beam which normally was made up of the "primary" beam. Obviously the intensely bright portion of the beam will be moved downwardly. However, it will be noted that a number of the upper rays of the "primary" beam which formerly were directed toward the upper part of the lens, and formed part of the lower portion of the resultant beam substantially at the focal distance forwardly of the lens, will be intercepted by the secondary reflector and hence will cease to make up a portion of the primary beam. On the other hand, it will be noted that a number of rays will be added to the lower portion of the "primary" beam by virtue of the downward movement of the lens and the forward portion of the secondary reflector. In this connection it will be noted that the rays last referred to normally pass to the lens from the secondary reflector and not from the conjugate focus and hence are brighter in the tilted beam since they emanate from the conjugate focus and are restricted to the limits of the desired resultant beam instead of being more or less scattered. These added rays in the lower portion of the "primary" beam as the latter passes through the lens will become part of the upper portion of the resultant beam substantially at the focal distance in front of the lens by virtue of the upward refraction of the lens. Thus the downward tilting of the resultant beam is considerably modified by the addition of rays to the upper portion thereof, and as a result, the actual dipping of the portion of the resultant beam made up of rays from the "primary" beam will be slight except as to the most brilliant portion thereof, which it is desired to tilt downwardly to eliminate glare. However, the simultaneous tilting of the lens and secondary reflector, causes the "secondary" beam to be tilted downwardly at a greater angle than the primary beam, thus taking away some light from the upper portion of the resultant beam. The building up of the upper portion of the beam in the manner referred to however, furnishes considerable distant light for use when passing vehicles, and it will be apparent that the tilting action does not materially lower the upper limit of the beam.

While the distribution of light previously described is a very efficient one and is particularly intense at the desired points, I have found that some considerable light from the extreme forward portion of the reflector 17 is lost against the inner end of the reflector 26. I have accordingly provided the groove 38 with its forwardly inclined walls 40 polished to a reflecting surface. Rays of light intercepted by these polished surfaces are reflected outwardly and slightly downwardly through the glasses 50, see Figures 3 and 4. While the reflecting surfaces 40 of the opening in the rear end of the secondary reflector will serve to add to the rays of light projected through the side windows, it will be apparent that the shape of the opening referred to is such that rays of light will be projected directly through each window from the forward portions of the elliptical reflector to the side of the conjugate focus opposite the window. The extension of the sides of the opening in the rear end of the secondary reflector permit such rays to be projected directly to the windows. The path of these rays will be apparent from an examination of Figure 3 of the drawings. The light reflected through the inner glass of each headlight is adapted to provide an effectual light for illuminating the engine compartment of the vehicle when desired while the light from the outer windows provides road edge illumination, the outer window of the right headlight effectually lighting the ditches to assist the driver in avoiding ditches when passing vehicles travelling in the opposite direction.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. A device of the character described comprising a light converging reflector having principal and conjugate foci, a light source arranged in said reflector and adapted to project toward the forward end of said reflector a circular beam which, as it passes the plane of the conjugate focus of said reflector, has a relatively intensely bright portion adjacent its center and decreases in brilliancy outwardly thereof, means for shaping the beam in such a manner that there will be projected forwardly of said reflector a resultant beam of greater width than depth and having a similar relatively intensely bright portion having a fixed normal position therein, and light projecting and concentrating means independent of said reflector movably positioned for materially changing the position of the intensely bright portion of the resultant beam from its normal position to a lower position in the resultant beam without materially changing the height of the upper limit of the latter.

2. A device of the character described comprising a light converging reflector having principal and conjugate foci and being provided in its forward end with a light opening, a light source arranged adjacent the principal focus of said reflector and adapted to project toward said light opening a circular beam which, as it passes the plane of the conjugate focus of said reflector, has a relatively intensely bright portion adjacent its center and decreases in brilliancy outwardly thereof, means arranged rearwardly of the light opening for shaping the beam in such a manner that there will be projected through the light opening a resultant beam of greater width than depth and having a similar relatively intensely bright portion having a fixed normal position therein, and light projecting and concentrating means independent of said reflector movably positioned for materially changing the position of the relatively intensely bright portion of the resultant beam from its normal position to a lower position in the resultant beam without materially changing the height of the upper limit of the latter.

3. A device of the character described comprising a light converging reflector having principal and conjugate foci, a light source arranged in said reflector, a secondary reflector arranged forwardly of said light converging reflector, said secondary reflector being formed as a surface of revolution surrounding the axis of said first named reflector and being provided in its rear end with a relatively small horizontally elongated opening adjacent said conjugate focus, the horizontal width of said opening being restricted at least to the diameter of the beam passing through said opening, a condensing lens arranged at the forward end of said secondary reflector and having its principal focus adjacent the opening in the rear end of said secondary reflector and slightly forwardly of the conjugate focus of said light converging reflector, said secondary reflector being adapted to intercept sharply diverging rays from the forward portion of said light converging reflector and direct them to said lens.

4. A device of the character described comprising a light converging reflector having principal and conjugate foci and being provided in its forward end with a light opening, a light source arranged adjacent the principal focus of said reflector and adapted to project toward said light opening a circular beam which, as it passes the plane of the conjugate focus of said reflector, has a relatively intensely bright portion adjacent its center and decreases in brilliancy outwardly thereof, light projecting and concentrating means arranged rearwardly of the light opening movably positioned for altering the beam in such a manner that there will be projected through the light opening a resultant beam of greater width than depth and having a similar relatively intensely bright portion having a fixed normal position therein, and means independent of said reflector for tilting the resultant beam including the intensely bright portion thereof downwardly without materially altering the height of the upper limit of the resultant beam.

5. A device of the character described comprising a light converging reflector having principal and conjugate foci, a light source arranged adjacent the principal focus of said reflector, a secondary reflector arranged forwardly of said conjugate focus and provided with an interior reflecting surface formed as a surface of revolution surrounding the axis of said first named reflector and having a relatively small opening in its rear end arranged adjacent said conjugate focus, a lens carried by said secondary reflector and adjustable longitudinally thereon, said lens having its rearward focus substantially coincident with said opening, and means for pivotally supporting said secondary reflector adjacent said opening to swing vertically.

6. A device of the character described comprising a light converging reflector having principal and conjugate foci, a light source arranged adjacent the principal focus of said reflector, a secondary reflector arranged forwardly of said conjugate focus and formed as a surface of revolution surrounding the axis of said first named reflector, said secondary reflector being provided in its rear end with a relatively small opening arranged adjacent said conjugate focus, a lens carried by said secondary reflector at its forward end, means for pivotally supporting said secondary reflector adjacent said opening to swing vertically, and vertically adjustable means for limiting the upward movement of the forward end of said secondary reflector.

7. A device of the character described comprising a light converging reflector having principal and conjugate foci, a light source arranged adjacent the principal focus, a secondary reflector provided with a polished interior surface formed as a surface of revolution surounding the axis of said first named reflector, said secondary reflector being relatively thick at its rear end and provided with a substantially horizontal transverse groove intersecting the reflecting surface to provide an opening arranged slightly forwardly of the conjugate focus of said first named reflector, the walls of said groove on opposite sides of said opening being inclined forwardly and polished to a reflecting surface, a casing surrounding said light source and said reflectors, said casing being provided with windows arranged outwardly of said grooves, said grooves being arranged in the path of light from the forward portion of said light condensing reflector, and a lens adjustably mounted to move longitudinally on the forward end of said secondary reflector and having its rearward focus substantially coincident with said opening.

8. A device of the character described comprising a light converging reflector having principal and conjugate foci, a light source arranged adjacent the principal focus, a secondary reflector provided with a polished interior surface formed as a surface of revolution surrounding the axis of said first named reflector, said secondary reflector being relatively thick at its rear end and provided with a substantially horizontal transverse grove intersecting the reflecting surface to provide an opening arranged slightly forwardly of the conjugate focus of said first named reflector, the walls of said groove on opposite sides of said opening being inclined forwardly and polished to a reflecting surface, a casing surrounding said light source and said reflectors, said casing being provided with windows arranged outwardly of said grooves, said grooves being arranged in the path of light from the forward portion of said light condensing reflector, and a lens mounted at the forward end of said secondary reflector and having its rearward focus substantially coincident with said opening, the opening in said secondary reflector being of a shape corresponding to that of the desired resultant beam inverted.

9. A device of the character described comprising a light converging reflector having principal and conjugate foci, a light source arranged adjacent the principal focus, a secondary reflector provided with a polished interior surface formed as a surface of revolution surrounding the axis of said first named reflector, said secondary reflector being relatively thick at its rear end and provided with a substantially horizontal transverse groove intersecting the reflecting surface to provide an opening arranged slightly forwardly of the conjugate focus of said first named reflector, the walls of said groove on opposite sides of said opening being inclined forwardly and polished to a reflecting surface, a casing surrounding said light source and said reflectors, said casing being provided with windows arranged outwardly of said grooves, said grooves being arranged in the path of light from the forward portion of said light condensing reflector, a lens mounted at the forward end of said secondary reflector and having its rearward focus substantially coincident with said opening, a transverse shaft pivotally supporting said secondary reflector adjacent its rear end whereby its forward end is adapted to swing vertically, means for limiting the upward movement of the forward end of said secondary reflector, and resilient means normally urging the forward end of said secondary reflector upwardly.

10. A device of the character described comprising a light converging reflector having principal and conjugate foci, a light source arranged adjacent the principal focus, a secondary reflector provided with a polished interior surface formed as a surface of revolution surrounding the axis of said first named reflector, said secondary reflector being relatively thick at its rear end and provided with a substantially horizontal transverse groove intersecting the reflecting surface to provide an opening in said secondary reflector slightly forwardly of the conjugate focus of said first named reflector, the walls of said groove on opposite sides of said opening being inclined forwardly and polished to a reflecting surface, a casing surrounding said light source and said reflectors, said casing being provided with windows arranged outwardly of said grooves, said grooves being arranged in the path of light from the forward portion of said light converging reflector, and a lens arranged at the forward end of said secondary reflector.

11. A device of the character described comprising a light converging reflector having principal and conjugate foci, a portion of said reflector extending forwardly substantially to the plane of the conjugate focus, a light source arranged adjacent the principal focus of said reflector, a secondary reflector arranged forwardly of said light converging reflector and provided in its rear end with a relatively small opening arranged adjacent the conjugate focus, said secondary reflector being adapted to intercept some of the rays from the forward portion of said light converging reflector and redirect them forwardly, a lens arranged in the path of rays from said secondary reflector and rays from the rear portion of said light converging reflector, and a casing surrounding said reflectors and provided in its forward end with an opening for the passage of rays from said lens, a portion of one side of the opening in said secondary reflector being extended forwardly, said casing being provided with a window arranged slightly forwardly of the conjugate focus of said light converging reflector and outwardly of and in radial alinement with the extended portion of the opening in said secondary reflector.

12. A device of the character described comprising a reflector, a light source arranged in said reflector, a secondary reflector arranged forwardly of said first named reflector, a condensing lens arranged forwardly of said secondary reflector, portions of said first named reflector being adapted to project a primary beam directly to said lens, said secondary reflector being adapted to intercept light rays from other portions of said primary reflector to project a secondary beam to said lens, said primary and secondary beams merging to form a composite beam passing through said lens, and means for tilting the secondary reflector and lens whereby said primary and secondary beams are bent at different angles.

In testimony whereof I affix my signature.

JOHN MINOR BOTTS LEWIS.